United States Patent
Kawamata et al.

(10) Patent No.: US 8,401,736 B2
(45) Date of Patent: Mar. 19, 2013

(54) DRIVING ASSISTANCE APPARATUS AND DRIVING ASSISTANCE METHOD

(75) Inventors: Shinya Kawamata, Gotenba (JP); Kenichi Kitahama, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 272 days.

(21) Appl. No.: 13/000,137

(22) PCT Filed: Jun. 19, 2009

(86) PCT No.: PCT/IB2009/006231
§ 371 (c)(1),
(2), (4) Date: Dec. 20, 2010

(87) PCT Pub. No.: WO2009/153661
PCT Pub. Date: Dec. 23, 2009

(65) Prior Publication Data
US 2011/0118939 A1    May 19, 2011

(30) Foreign Application Priority Data

Jun. 20, 2008  (JP) ................................ 2008-162378
Jun. 20, 2008  (JP) ................................ 2008-162388

(51) Int. Cl.
*A01B 69/00*    (2006.01)

(52) U.S. Cl. ................ 701/41; 701/10; 701/36; 180/6.2
(58) Field of Classification Search ................ 701/1, 10, 701/36, 41, 70; 180/168, 170, 197, 199, 180/6.2, 252
See application file for complete search history.

(56) References Cited

U.S. PATENT DOCUMENTS

| 6,170,600 | B1 | 1/2001 | Shimizu |
| 2003/0163252 | A1 | 8/2003 | Matsumoto et al. |
| 2006/0047401 | A1 | 3/2006 | Boecker et al. |
| 2010/0299000 | A1* | 11/2010 | Nakamura et al. ................. 701/1 |

FOREIGN PATENT DOCUMENTS

| JP | 7-137589 | A | 5/1995 |
| JP | 9-161196 | A | 6/1997 |
| JP | 10-309961 | A | 11/1998 |
| JP | 2000-211543 | A | 8/2000 |
| JP | 2000-276690 | A | 10/2000 |
| JP | 2001-23094 | A | 1/2001 |
| JP | 2001-199295 | A | 7/2001 |
| JP | 2002-2518 | A | 1/2002 |
| JP | 2002-230682 | A | 8/2002 |
| JP | 2002-251690 | A | 9/2002 |

(Continued)

OTHER PUBLICATIONS

International Search Report and Written Opinion issued on Sep. 21, 2009 in corresponding International Application No. PCT/IB2009/006231 filed on Jun. 19, 2009.

(Continued)

*Primary Examiner* — Gertrude Arthur Jeanglaude
(74) *Attorney, Agent, or Firm* — Oblon, Spivak, McClelland, Maier & Neustadt, L.L.P.

(57) ABSTRACT

Traveling environment information, which is information on a traveling environment around a vehicle, is obtained. If the automation level of the vehicle, which is set according to the traveling environment information, is decreased, the driving assistance level is decreased in a stepwise manner to execute a driving assistance control.

12 Claims, 11 Drawing Sheets

FOREIGN PATENT DOCUMENTS

| | | |
|---|---|---|
| JP | 2004-256076 A | 9/2004 |
| JP | 2004-334283 A | 11/2004 |
| JP | 2004-345571 A | 12/2004 |
| JP | 2006-195641 A | 7/2006 |
| JP | 2006-215862 A | 8/2006 |
| JP | 2007-1475 A | 1/2007 |
| JP | 2008-56059 A | 3/2008 |

OTHER PUBLICATIONS

Japanese Office Action issued on Apr. 13, 2010 in corresponding Japanese Application No. 2008-162378 (with a Partial English Translation).

Japanese Office Action issued on Apr. 13, 2010 in corresponding Japanese Application No. 2008-162388 (with a Partial English Translation).

* cited by examiner

DRIVING ASSISTANCE APPARATUS AND DRIVING ASSISTANCE METHOD

BACKGROUND OF THE INVENTION

1. Field of the Invention

The invention relates to a driving assistance apparatus and a driving assistance method that assist driving of a movable body such as a vehicle.

2. Description of the Related Art

Technologies for assisting driving of a vehicle and the like are available. For example, Japanese Patent Application Publication No. 2002-230682 (JP-A-2002-230682) describes a system in which it is determined whether a vehicle can be automatically driven. In the system, calculations are performed to determine whether a steering operation can be performed, whether a deceleration operation can be performed, and whether an acceleration operation can be performed, based on, the amount of steering of the vehicle and a vehicle speed. Thus, it is determined whether the vehicle can be automatically driven. In the system, if it is determined that the vehicle cannot be automatically driven, a change of a driving mode to an automatic driving mode is stopped, and the vehicle is manually driven.

In the system, when a driving assistance control for automatic driving or the like ends, the driver of the vehicle may feel discomfort. For example, if the driving mode is suddenly changed to the automatic driving mode at the start of the driving assistance control, the driver may feel discomfort because driving operation performed by the driver is not reflected in a manner in which the vehicle travels. The driver may also feel discomfort when the automation level of the automatic driving control is changed during the automatic driving control.

SUMMARY OF THE INVENTION

The invention provides a driving assistance apparatus and a driving assistance method that reduce the possibility that a driver feels discomfort when a driving assistance level is changed.

A first aspect of the invention relates to a driving assistance apparatus that includes surrounding environment information obtaining means for obtaining traveling environment information that is information on a traveling environment around a vehicle; driving assistance means for performing a driving assistance operation that assists a driver of the vehicle in driving the vehicle; and driving assistance control means for controlling the driving assistance means so that the driving assistance operation is performed according to the obtained traveling environment information, and for executing a control so that a level of the driving assistance operation is gradually changed if the level of the driving assistance operation is changed.

In the driving assistance apparatus according to the above-described aspect, the driving assistance control means may set a reliability degree of the obtained traveling environment information, and may execute a control so that the level of the driving assistance operation is changed according to the set reliability degree.

In the driving assistance apparatus according to the above-described aspect, the driving assistance control means may execute a control so that the level of the driving assistance operation is changed in a stepwise manner if the level of the driving assistance operation is gradually changed.

In the driving assistance apparatus according to the above-described aspect, the driving assistance control means may execute a control so that the level of the driving assistance operation is gradually decreased if the level of the driving assistance operation is decreased.

With the above-described configuration, if the level of the driving assistance operation performed by the driving assistance means is decreased, the level of the driving assistance operation is decreased in a stepwise manner. Thus, it is possible to make the driver of the vehicle aware that the level of the driving assistance operation is decreased. Accordingly, it is possible to reduce the sense of discomfort of the driver, which is caused by the decrease in the level of the driving assistance operation.

In the driving assistance apparatus according to the above-described aspect, the driving assistance control means may execute a control so that the level of the driving assistance operation is decreased as the reliability degree of the traveling environment information is set to decrease.

With the above-described configuration, the level of the driving assistance operation is decreased as the reliability degree of the traveling environment information is set to decrease. Thus, it is possible to avoid the situation where advanced driving assistance is provided using the traveling environment information with low reliability degree. Accordingly, it is possible to provide appropriate driving assistance according to the reliability degree of the traveling environment information.

In the driving assistance apparatus according to the above-described aspect, if it is predicted that the vehicle will enter an area where the reliability degree of the traveling environment information is set to a low value, the driving assistance control means may execute a control so that the level of the driving assistance operation is decreased before the vehicle enters the area.

With the above-described configuration, if it is predicted that the vehicle will enter an area where the reliability degree of the traveling environment information is set to a low value, the level of the driving assistance operation is decreased before the vehicle enters the area. Thus, if it is predicted that the vehicle enters an area where the reliability of the traveling environment information is set to a low value, it is possible to adjust the level of the driving assistance operation to a low value in advance. Accordingly, it is possible to provide appropriate driving assistance according to the reliability degree of the traveling environment information.

In the driving assistance apparatus according to the above-described aspect, if it is determined that a time period, in which the level of the driving assistance operation will remain decreased, is shorter than a predetermined time period when it is predicted that the level of the driving assistance operation will be decreased, the driving assistance control means may execute a control so that the level of the driving assistance operation is not decreased.

With the above-described configuration, if it is determined that the time period, in which the level of the driving assistance operation will remain decreased, is shorter than a predetermined time period when it is predicted that the level of the driving assistance operation will be decreased, the driving assistance is provided without decreasing the level of the driving assistance operation. Thus, it is possible to reduce the possibility that contents of the driving assistance are frequently changed.

The driving assistance apparatus according to the above-described aspect may further include sensed speed adjustment means for increasing a speed of the vehicle sensed by an occupant of the vehicle if the level of the driving assistance operation performed by the driving assistance means is decreased according to the traveling environment information.

With the above-described configuration, if the level of the driving assistance operation is decreased according to the traveling environment information, the sensed speed of the vehicle is increased. Thus, it is possible to naturally urge the driver of the vehicle to perform a driving operation.

In the driving assistance apparatus according to the above-described aspect, the driving assistance control means may execute a control so that the level of the driving assistance operation is gradually increased if the level of the driving assistance operation is increased.

With the above-described configuration, if the level of the driving assistance operation is increased, the level of the driving assistance operation is gradually increased. Thus, it is possible to reduce the sense of discomfort of the driver, which is caused by the increase in the level of the driving assistance operation.

In the driving assistance apparatus according to the above-described aspect, the driving assistance control means may execute a control so that the level of the driving assistance operation is increased according to a state of a driving operation performed by the driver of the vehicle if the level of the driving assistance operation is increased.

In the driving assistance apparatus according to the above-described aspect, the driving assistance means may execute a plurality of the driving assistance operations; and the driving assistance control means may select the driving assistance operation whose level is to be increased, from among the plurality of the driving assistance operations, according to a state of a driving operation performed by the driver of the vehicle.

In the driving assistance apparatus according to the above-described aspect, the plurality of the driving assistance operations may include an operation that assists the driver in operating a steering wheel, an operation that assists the driver in operating an accelerator, and an operation that assists the driver in operating a brake.

In the driving assistance apparatus according to the above-described aspect, the driving assistance control means may execute a control so that a driver's load relating to a driving operation is increased, as the level of the driving assistance operation is increased.

A second aspect of the invention relates to a driving assistance apparatus that includes surrounding environment information obtaining means for obtaining traveling environment information that is information on a traveling environment around a vehicle; driving assistance means for performing a driving assistance operation that assists a driver of the vehicle in driving the vehicle; and driving assistance control means for controlling the driving assistance operation performed by the driving assistance means according to the obtained traveling environment information, and for increasing a level of the driving assistance operation according to a state of a driving operation performed by the driver of the vehicle.

With the above-described configuration, if the level of the driving assistance operation is increased, the level of the driving assistance operation is increased according to the state of the driving operation performed by the driver. Thus, it is possible to reduce the sense of discomfort of the driver, which is caused by the increase in the level of the driving assistance.

A third aspect of the invention relates to a driving assistance method that includes obtaining means for obtaining traveling environment information that is information on a traveling environment around a vehicle; performing a driving assistance operation that assists a driver of the vehicle in driving the vehicle; setting a reliability degree of the obtained traveling environment information; performing the driving assistance operation whose level corresponds to the set reliability degree; and gradually changing the level of the driving assistance operation if the level of the driving assistance operation is changed.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
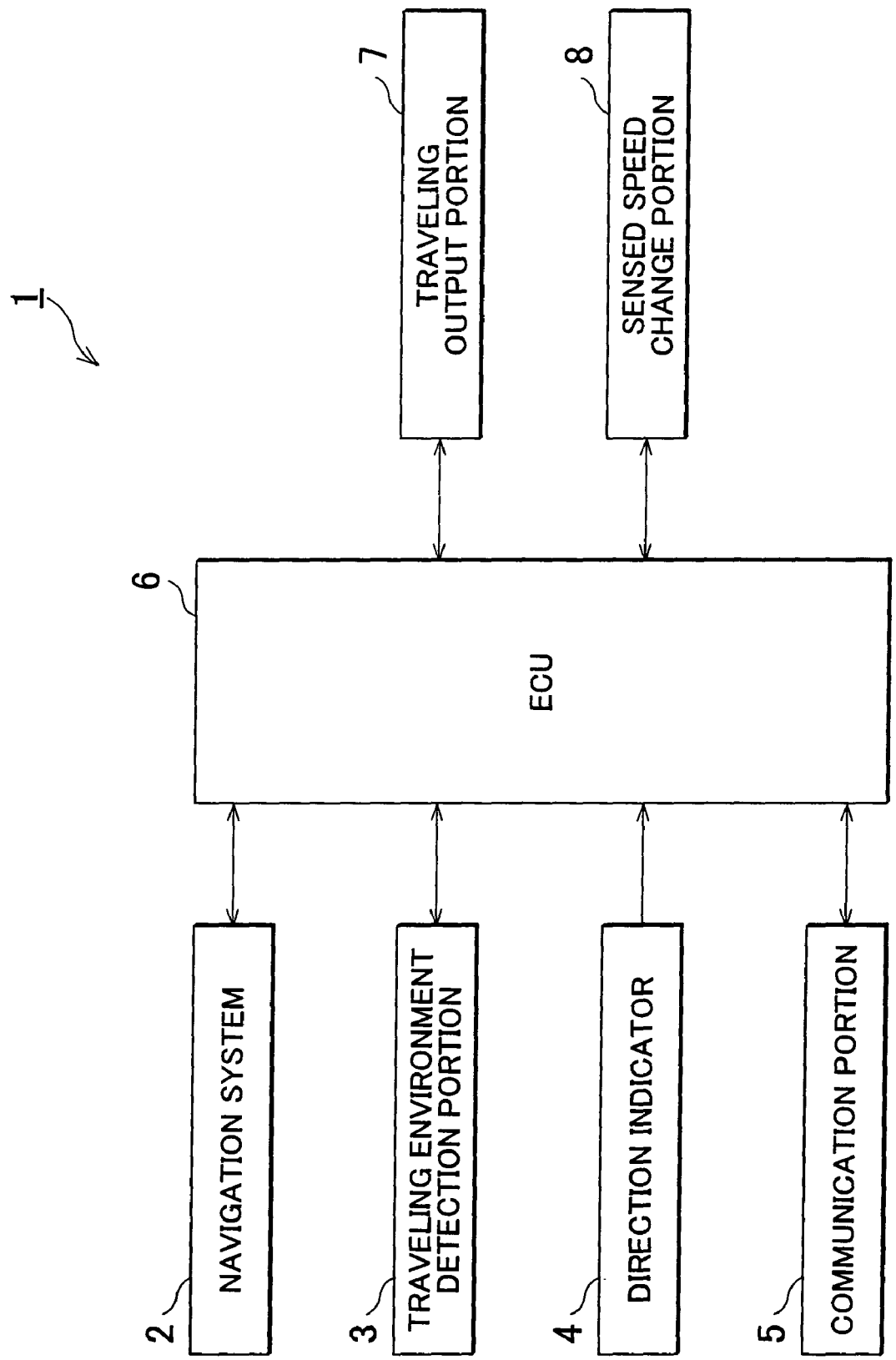
FIG. 1 is a schematic configuration diagram showing a driving assistance apparatus according to a first embodiment of the invention.

Hereinafter, embodiments of the invention will be described with reference to the accompanying drawings. In the description of the drawings, the same and corresponding components are denoted by the same reference numerals, and the redundant description thereof will be omitted.

FIG. 1 is a schematic configuration diagram showing a driving assistance apparatus according to a first embodiment of the invention.

As shown in FIG. 1, a driving assistance apparatus 1 according to the embodiment is installed in a vehicle for which driving assistance is provided. Thus, the driving assistance apparatus 1 assists the driving of the vehicle. For example, in the driving assistance apparatus 1, the automation level of the vehicle is set according to a traveling environment in which the vehicle is traveling, and an automatic driving control is executed.

The driving assistance apparatus 1 includes a navigation system 2, a traveling environment detection portion 3, a direction indicator 4, a communication portion 5, an Electronic Control Unit (ECU) 6, a traveling output portion 7, and a sensed speed change portion 8.

The navigation system 2 functions as host vehicle position detection means for detecting the position of a host vehicle. For example, the navigation system 2 includes road map data, and detects a position using a Global Positioning System (GPS). The navigation system 2 sets a traveling route for a vehicle. The traveling route set by the navigation system 2 is input to the ECU 6 and stored in the ECU 6 as traveling route information.

The traveling environment detection portion 3 detects a traveling environment in which the vehicle is traveling, by detecting, for example, objects around the vehicle. Thus, the traveling environment detection portion 3 functions as surrounding environment information obtaining means for obtaining information on the traveling environment around the vehicle (hereinafter, may be referred to as "traveling environment information). For example, a millimeter wave radar, a laser radar, or a camera is used as the traveling environment detection portion 3. A signal detected by the traveling environment detection portion 3 is input to the ECU 6, and stored in the ECU 6 as the traveling environment information.

The direction indicator 4 indicates a direction in which the vehicle is traveling. The direction indicator 4 is used as traveling direction estimation means for estimating the direction in which the vehicle is traveling. The communication portion 5 is communication means for performing inter-vehicle communication and road-vehicle communication. The communication portion 5 functions as surrounding environment information obtaining means for obtaining information on the traveling environment ahead of the vehicle, through communication. In the driving assistance apparatus 1, the direction indicator 4 and the communication portion 5 may be omitted.

The ECU 6 controls the entire driving assistance apparatus 1. For example, the ECU 6 mainly includes a computer that includes a CPU, a ROM, and a RAM. The ECU 6 functions as driving assistance control means. The ECU 6 sets the reliability degree of the traveling environment information based on the traveling environment information, and the set reliability degree is stored in the ECU 6. The ECU 6 controls a driving assistance operation performed by the traveling output portion 7 (described later), according to the reliability degree. The ECU 6 executes a control of the driving assistance operation (hereinafter, referred to as "driving assistance control") so that the level of the driving assistance (hereinafter, referred to as "driving assistance level") is gradually decreased if the driving assistance level is decreased. For example, the ECU 6 executes the driving assistance control so that the driving assistance level is decreased in a stepwise manner if the driving assistance level is decreased. If it is predicted that the vehicle will enter an area where the reliability degree of the traveling environment information is set to a low value, the ECU 6 decreases the driving assistance level in advance.

For example, the driving assistance level is the level of automation of automatic driving. The driving assistance level is set according to the reliability degree of the traveling environment information. The driving assistance level may be set to decrease as the reliability degree of the traveling environment information is decreased. Thus, when the reliability degree of the traveling environment information is low, the driving assistance is appropriately provided according to the reliability degree.

The ECU 6 includes a traveling environment database in which the traveling environment information is stored and reserved. Thus, the ECU 6 functions as driving assistance level calculation means for setting the driving assistance level based on the reliability degree of the traveling environment information. Also, the ECU 6 functions as correction means for correcting the reliability degree of the traveling environment information so that the driving assistance level is not decreased, if it is determined that a time period, in which the driving assistance level will remain decreased, is shorter than a predetermined time period when it is predicted that the driving assistance level will be decreased. Also, the ECU 6 functions as sensed speed adjustment means for increasing the speed of the vehicle sensed by an occupant of the vehicle, if the driving assistance level is decreased according to the traveling environment information.

The traveling output portion 7 performs an operation that drives the host vehicle, an operation that brakes the host vehicle, and an operation that steers the host vehicle, according to a control signal output from the ECU 6. For example, the traveling output portion 7 includes an engine ECU, a brake ECU, and a steering ECU.

The sensed speed change portion 8 functions as sensed speed adjustment means for adjusting the sensed vehicle speed. For example, the sensed speed change portion 8 includes a vehicle height adjustment mechanism, a speedometer adjustment mechanism, and a steering response adjustment mechanism.

Next, the operation of the driving assistance apparatus according to the embodiment will be described.

Figure 2:
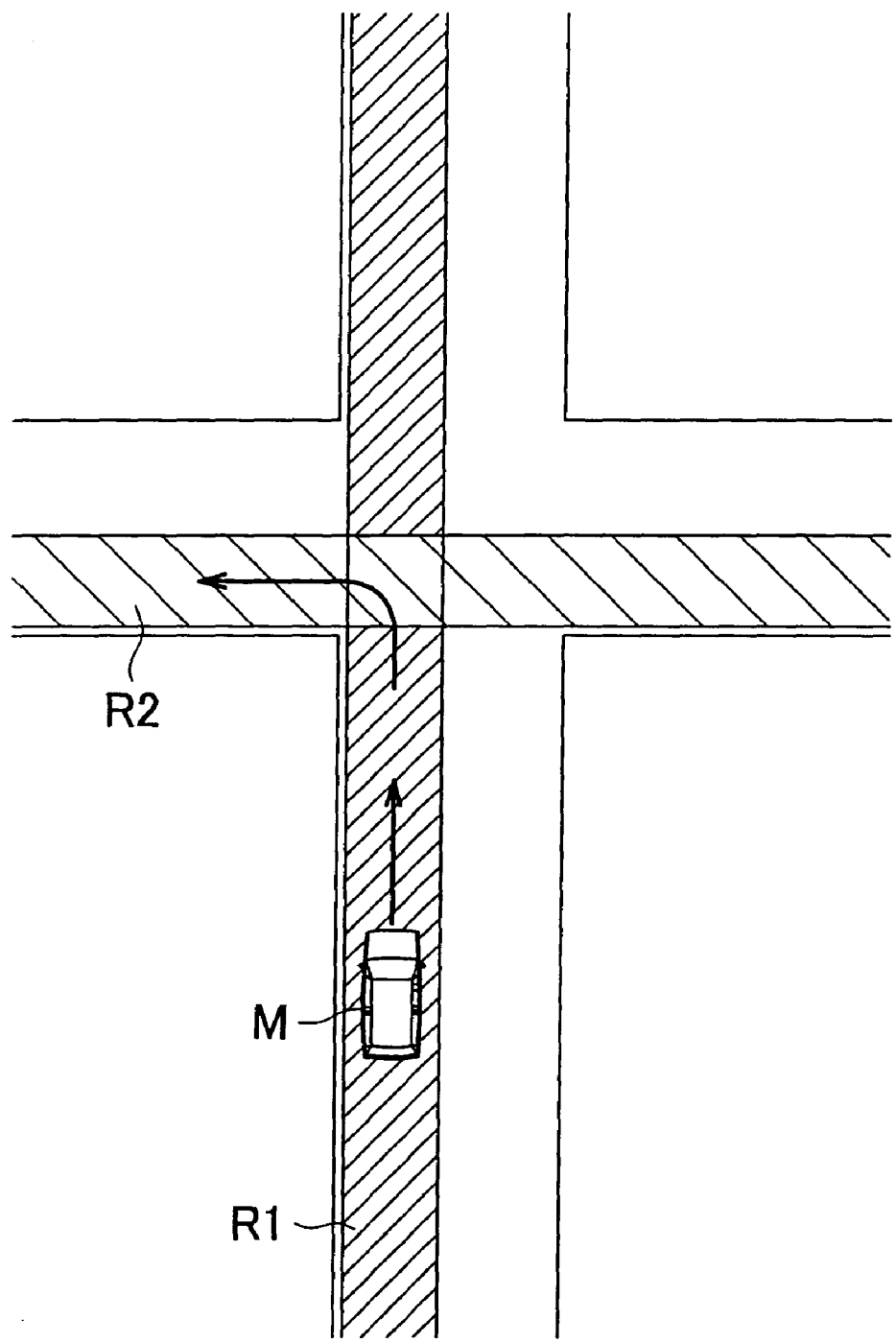
FIG. 2 is a diagram illustrating the operation of the driving assistance apparatus shown in FIG. 1.
Figure 3A:
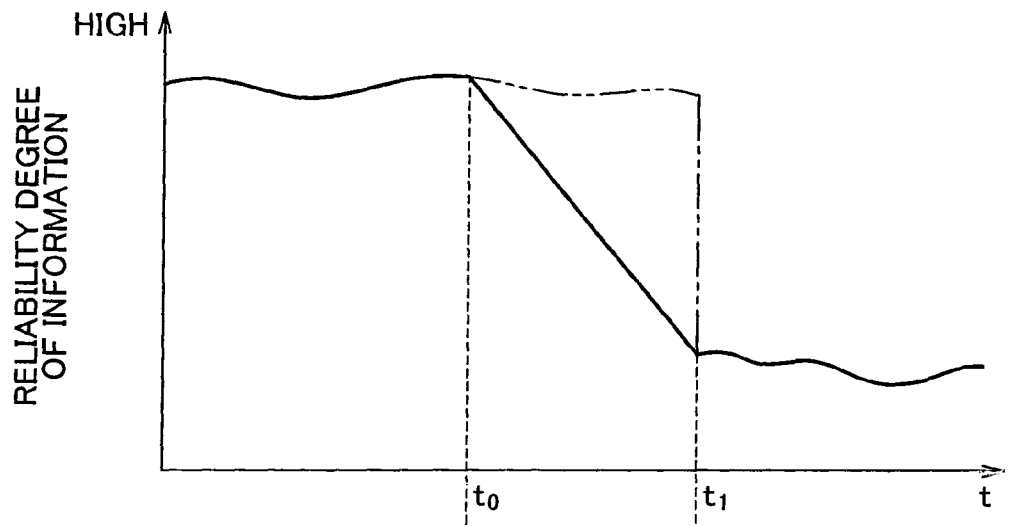
FIGS. 3A, 3B, and 3C are diagrams illustrating the operation of the driving assistance apparatus shown in FIG. 1.
Figure 3B:
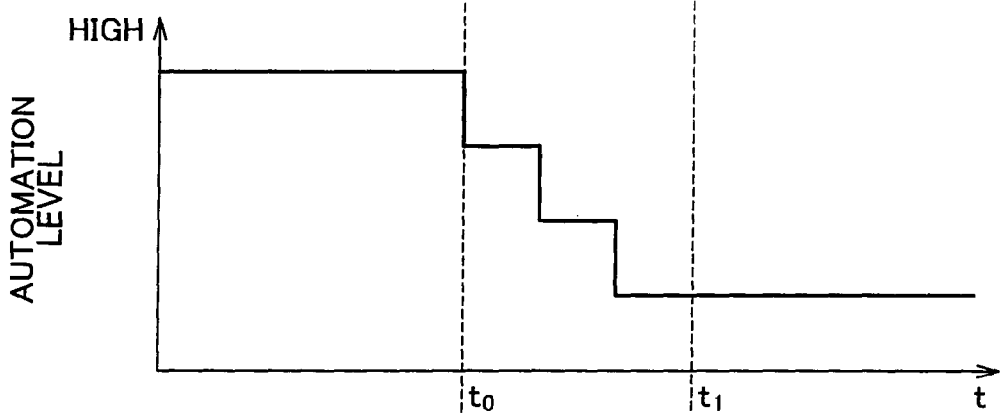

FIG. 2 is a diagram illustrating the operation of the driving assistance apparatus according to the embodiment. FIGS. 3A to 3B are diagrams showing the contents of the driving assistance when the reliability degree of the traveling environment information is decreased.

As shown in FIG. 2, a vehicle M, for which the driving assistance is provided, travels on a route R1. If the reliability degree of the information on the traveling environment on the route R1 is high, the driving assistance level is set to a high level in accordance with the high reliability degree, and the driving assistance control at the high driving assistance level is executed. For example, an automatic driving control is executed so that a steering operation, an accelerator operation, and a brake operation are all automated.

When the vehicle M turns to the left at an intersection, the vehicle M moves from the route R1 to a route R2. If the reliability degree of the information on the traveling environment on the route R2 is lower than the reliability degree of the information on the traveling environment on the route R1, the reliability degree is sharply decreased as shown in FIG. 3A (refer to a two-dot chain line during a time period from a time point t0 to a time point t1).

In this case, in the driving assistance apparatus 1, a decrease in the reliability degree of the traveling environment information is predicted, and the reliability degree of the information is adjusted to be decreased in advance (refer to a solid line during a time period from the time point t0 to the time point t1 in FIG. 3A). Thus, when the driving assistance level, that is, the automation level is set according to the reliability degree of the information, the automation level is gradually decreased as shown in FIG. 3B.

Figure 3C:
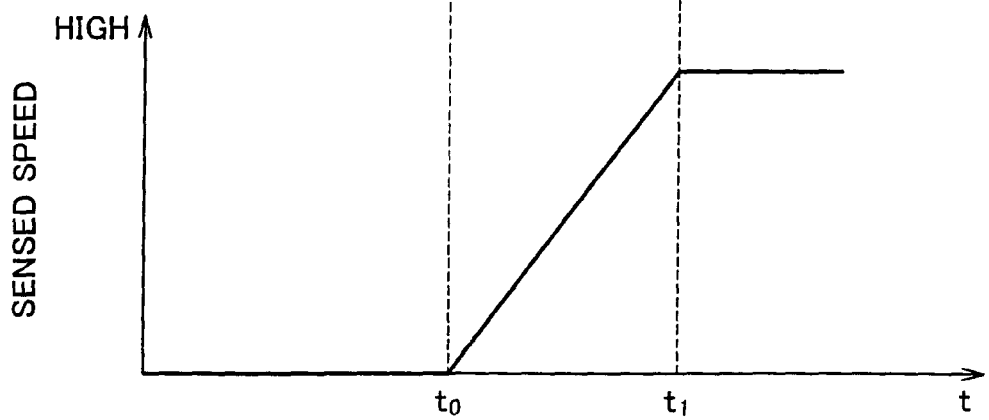

Also, as shown in FIG. 3C, if a decrease in the reliability degree of the traveling environment information is predicted, the sensed speed of the vehicle M is adjusted to be gradually increased. For example, the vehicle height is adjusted to be gradually decreased, and the speed value of the speedometer is adjusted to be gradually increased, and the steering response is adjusted to be increased.

Figure 4:
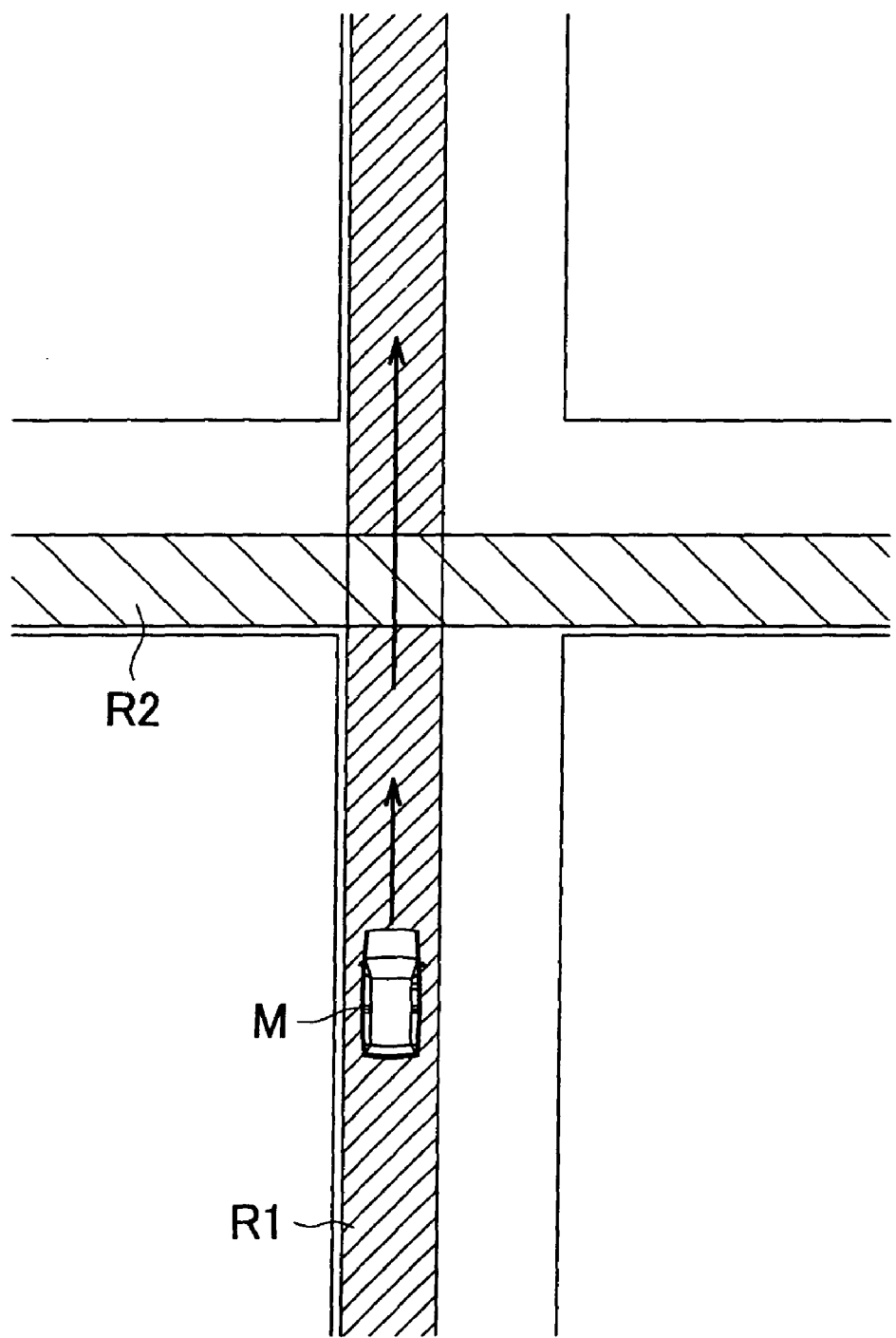
FIG. 4 is a diagram illustrating the operation of the driving assistance apparatus shown in FIG. 1.
Figure 5A:
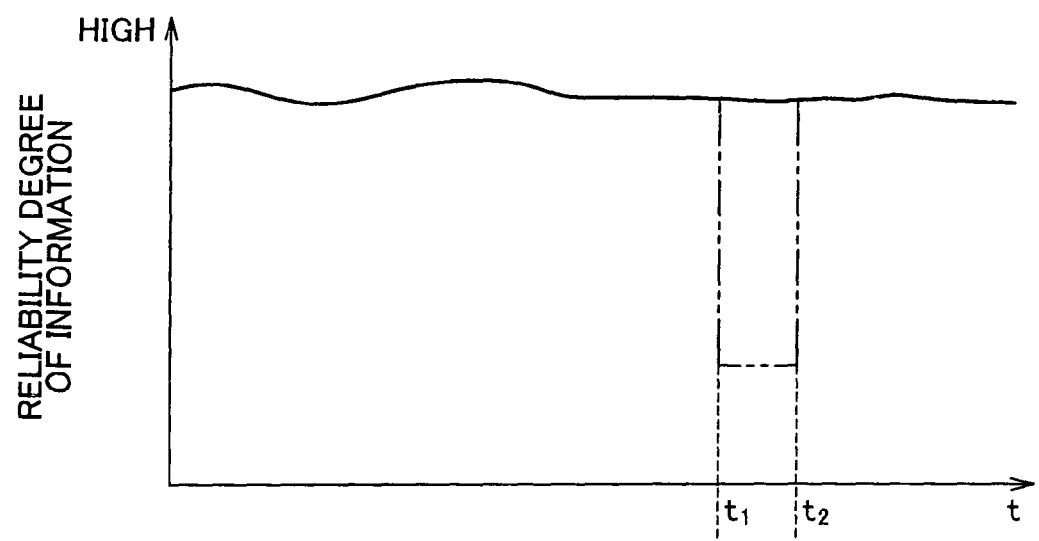
FIG. 5A and FIG. 5B are diagrams illustrating the operation of the driving assistance apparatus shown in FIG. 1.
Figure 5B:
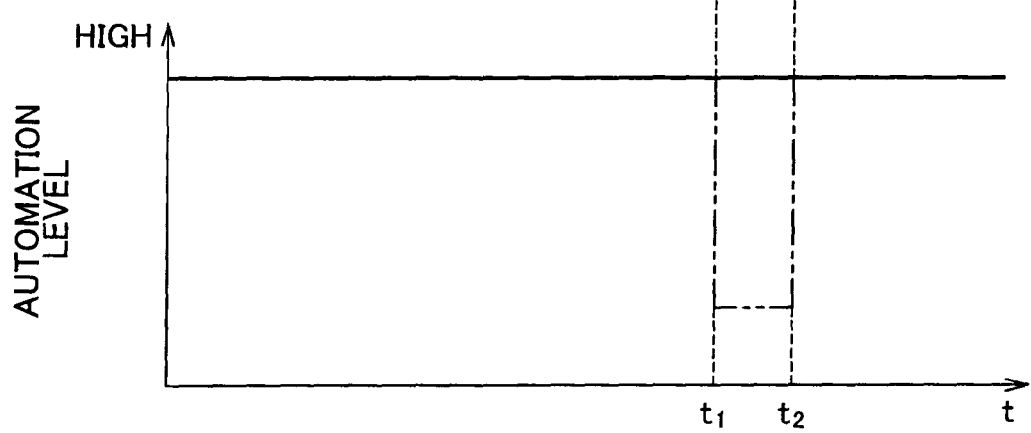

FIG. 4 is a diagram illustrating the operation of the driving assistance apparatus according to the embodiment. FIG. 5A and FIG. 5B are diagrams showing the contents of the driving assistance when the reliability degree of the traveling environment information is temporarily decreased.

As shown in FIG. 4, the vehicle M, for which the driving assistance is provided, travels on the route R1. If the reliability degree of the information on the traveling environment on the route R1 is high, the driving assistance level is set to a high level in accordance with the high reliability degree, and the driving assistance control at the high driving assistance level is executed. For example, the automatic driving control is executed so that the steering operation, the accelerator operation, and the brake operation are all automated.

When the vehicle M travels straight and passes the intersection, the vehicle M temporarily moves from the route R1 to the route R2, and passes the route R2. If the reliability degree of the information on the traveling environment on the route R2 is lower than the reliability degree of the information on the traveling environment on the route R1, the reliability degree of the information is temporarily decreased as shown in FIG. 5A (refer to the two-dot chain line during the time period from the time point t1 to the time point t2). However, if the automatic driving control suddenly ends, and thus, a driving mode is suddenly changed from an automatic driving mode to a manual driving mode, a driver cannot stably perform a driving operation. Also, if a section in which the vehicle travels is changed between an automatic driving section and a non-automatic driving section, the driving mode is changed between the automatic driving mode and the manual driving mode each time the section is changed between the automatic driving section and the non-automatic driving section. Thus, the driver feels discomfort.

In this case, in the driving assistance apparatus 1, a temporal decrease in the reliability degree of the traveling environment information is predicted, and the reliability degree of the information is adjusted in advance so that the reliability is not decreased (refer to the solid line during the time period from the time point t1 to the time point t2 in FIG. 5A). Therefore, when the driving assistance level, that is, the automation level is set according to the reliability degree of the information, the automation level is prevented from fluctuating, and stable driving assistance is provided as shown by the solid line in FIG. 5B.

Figure 6:
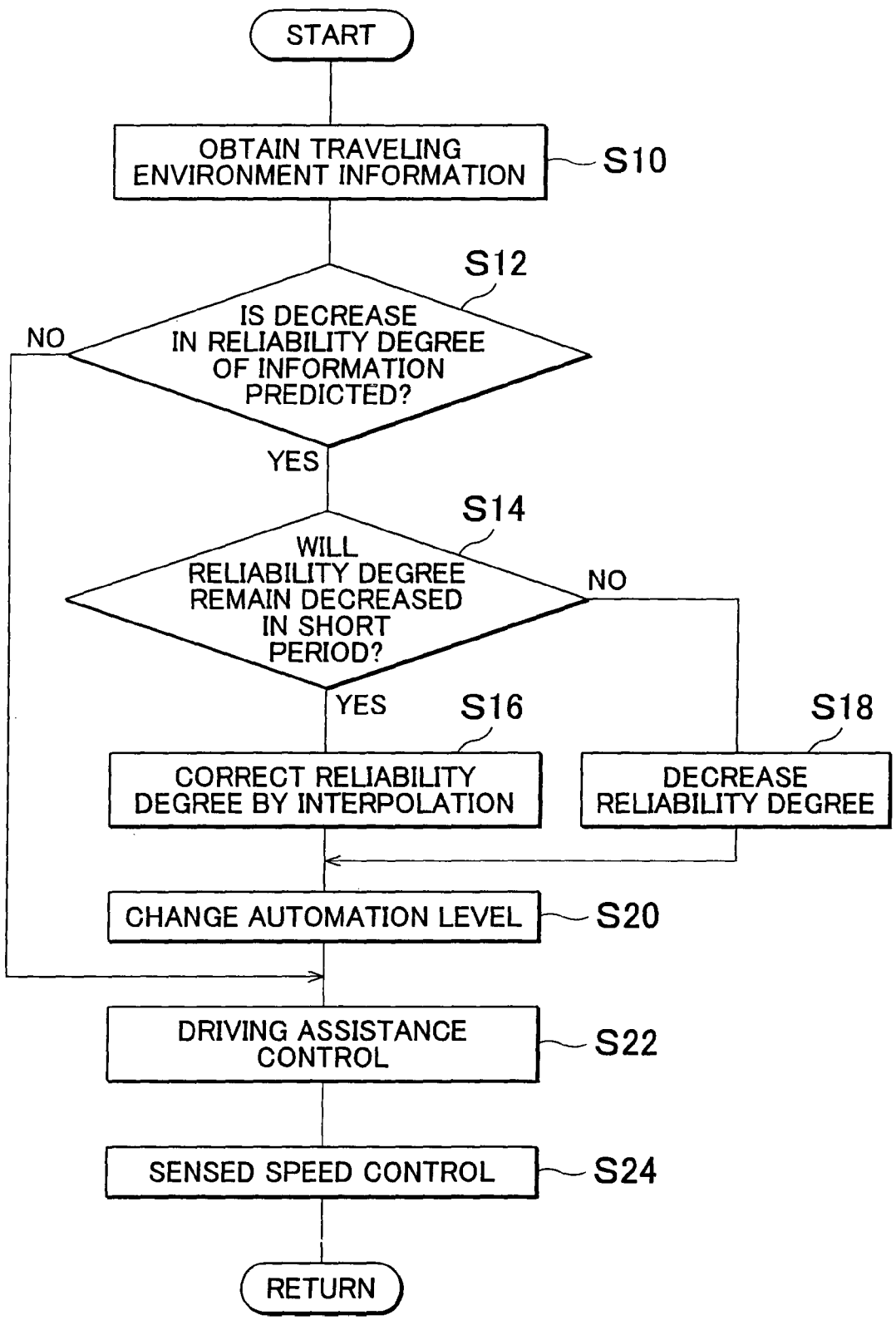
FIG. 6 is a flowchart showing the operation of the driving assistance apparatus shown in FIG. 1.

FIG. 6 is a flowchart showing the operation of the driving assistance apparatus according to the embodiment.

A control routine shown in FIG. 6 is repeatedly executed, for example, by the ECU 6 at predetermined time intervals. First, as shown in step S10 in FIG. 6, a traveling environment information obtaining process is executed. In the traveling environment information obtaining process, the information on the traveling environment around the vehicle, for which the driving assistance is provided, is obtained. For example, the traveling environment information is obtained based on information detected by the traveling environment detection portion 3. Also, the traveling environment information may be obtained based on information received by the communication portion 5. The reliability degree is set based on the obtained traveling environment information, and the set reliability degree is stored in the ECU 6. The automation level is set according to the reliability degree of the traveling environment information. At this time, the automation level is set to decrease as the reliability degree of the traveling environment information is decreased.

The automation level is set in a stepwise manner. More specifically, if the automation level is set to a high level, the steering operation, the accelerator operation, and the brake operation are all automated. If the automation level is set to a medium level, the accelerator operation and the brake operation are automated. If the automation level is set to a low level, only the brake operation is automated.

Then, the routine proceeds to step S12. In step S12, it is determined whether a decrease in the reliability degree of the traveling environment information is predicted. If it is determined that a decrease in the reliability degree of the traveling environment information as not predicted in step S12, the automatic driving control is executed according to the automation level that is set according to the reliability degree of the traveling environment information (S22).

If it is determined that a decrease in the reliability degree of the traveling environment information is predicted in step S12, it is determined whether a time period, in which the reliability degree of the traveling environment information will remain decreased, is shorter than a predetermined time period (S14). The predetermined time period is set by the ECU 6 in advance. If it is determined that the time period, in which the reliability degree of the traveling environment information will remain decreased, is equal to or longer than the predetermined time period, a correction process for correcting the reliability degree of the traveling environment information is executed to gradually decrease the reliability degree of the traveling environment information (S18). In this correction process for correcting the reliability degree, the reliability degree of the traveling environment information is corrected to be decreased in advance, before the vehicle reaches a point in a road, at which the reliability degree of the traveling environment information is predicted to be decreased. For example, the correction process is executed so that the reliability degree of the information is gradually decreased as shown by the solid line during the time period from the time point t0 to the time point t1 in FIG. 3A.

If it is determined that the time period, in which the reliability degree of the traveling environment information will remain decreased, is shorter than the predetermined time period in step S14, the correction process for correcting the reliability degree of the traveling environment information is executed so that the reliability degree of the traveling environment information is not decreased (S16). In this correction process for correcting the reliability degree, the reliability degree of the traveling environment information is corrected by interpolation so that reliability degree of the traveling environment information is not decreased when the vehicle reaches the point in the road, at which the reliability degree of the traveling environment information is predicted to be decreased. For example, the correction process is executed so that the reliability degree of the information is not decreased as shown by the solid line during the time period from the time point t1 to the time point t2 in FIG. 5A.

Then, the routine proceeds to step S20 in FIG. 6. In step S20, an automation level change process is executed. In the automation level change process, the automation level is changed according to the corrected reliability degree of the traveling environment information. For example, the automation level is changed as shown by the solid line in FIG. 3A or FIG. 5B. At this time, if the driving assistance level, that is, the automation level is decreased, the driving assistance level is gradually decreased. In FIG. 3B, the automation level is decreased in a stepwise manner by changing the contents of the driving assistance in the stepwise manner. However, the automation level may be gradually decreased by linearly decreasing the amount of the driving assistance.

Then, the routine proceeds to step S22. In step S22, a driving assistance control process is executed. In the driving assistance control process, the driving assistance control is executed according to the automation level. For example, if the automation level is set to the level at which the steering operation, the accelerator operation, and the brake operation are all automated, the driving assistance control is executed to automate the steering operation, the accelerator operation, and the brake operation. If the automation level is set to the level at which the accelerator operation and the brake operation are automated, the driving assistance control is executed to automate the accelerator operation and the brake operation. If the automation level is set to the level at which only the brake operation is automated, the driving assistance control is executed to automate the brake operation.

Then, the routine proceeds to step S24. In step S24, a sensed speed control process is executed. In the sensed speed control process, if the automation level is decreased, a control is executed to increase the speed of the vehicle sensed by the driver. For example, if the automation level is decreased, the vehicle height is adjusted to be gradually decreased, the speed value of the speedometer is adjusted to be gradually increased, and the steering response is adjusted to be increased. When the process in step S24 ends, the control routine ends.

As described above, in the driving assistance apparatus according to the embodiment, if the driving assistance level is decreased, the driving assistance level is gradually decreased. Thus, it is possible to make the driver of the vehicle aware that the driving assistance level is decreased. Accordingly, it is possible to reduce the sense of discomfort of the driver, which is caused by the decrease in the driving assistance level.

Also, in the driving assistance apparatus according to the embodiment, the driving assistance level, that is, the automation level is decreased as the reliability degree of the traveling environment information is decreased. Thus, it is possible to avoid the situation where advanced driving assistance is provided using the traveling environment information with low reliability degree. Accordingly, it is possible to provide appropriate driving assistance according to the reliability degree of the traveling environment information.

Also, in the driving assistance apparatus according to the embodiment, if it is predicted that the vehicle will enter an area where the reliability degree of the traveling environment information is set to a low value, the driving assistance level is decreased before the vehicle enters the area. Thus, it is possible to adjust the driving assistance level to a low level before the vehicle enters an area where the reliability degree of the traveling environment information is set to a low value. Therefore, it is possible to provide appropriate driving assistance according to the reliability degree of the traveling environment information.

Also, in the driving assistance apparatus according to the embodiment, if it is determined that the time period, in which the driving assistance level will remain decreased, is shorter than the predetermined time period when it is predicted that the driving assistance level will be decreased, the driving assistance is provided without decreasing the driving assistance level. Thus, it is possible to reduce the possibility that the contents of the driving assistance are frequently changed.

Further, if the driving assistance level is decreased according to the traveling environment information, the sensed vehicle speed is increased. Thus, it is possible to naturally urge the driver of the vehicle to perform a driving operation.

Figure 7:
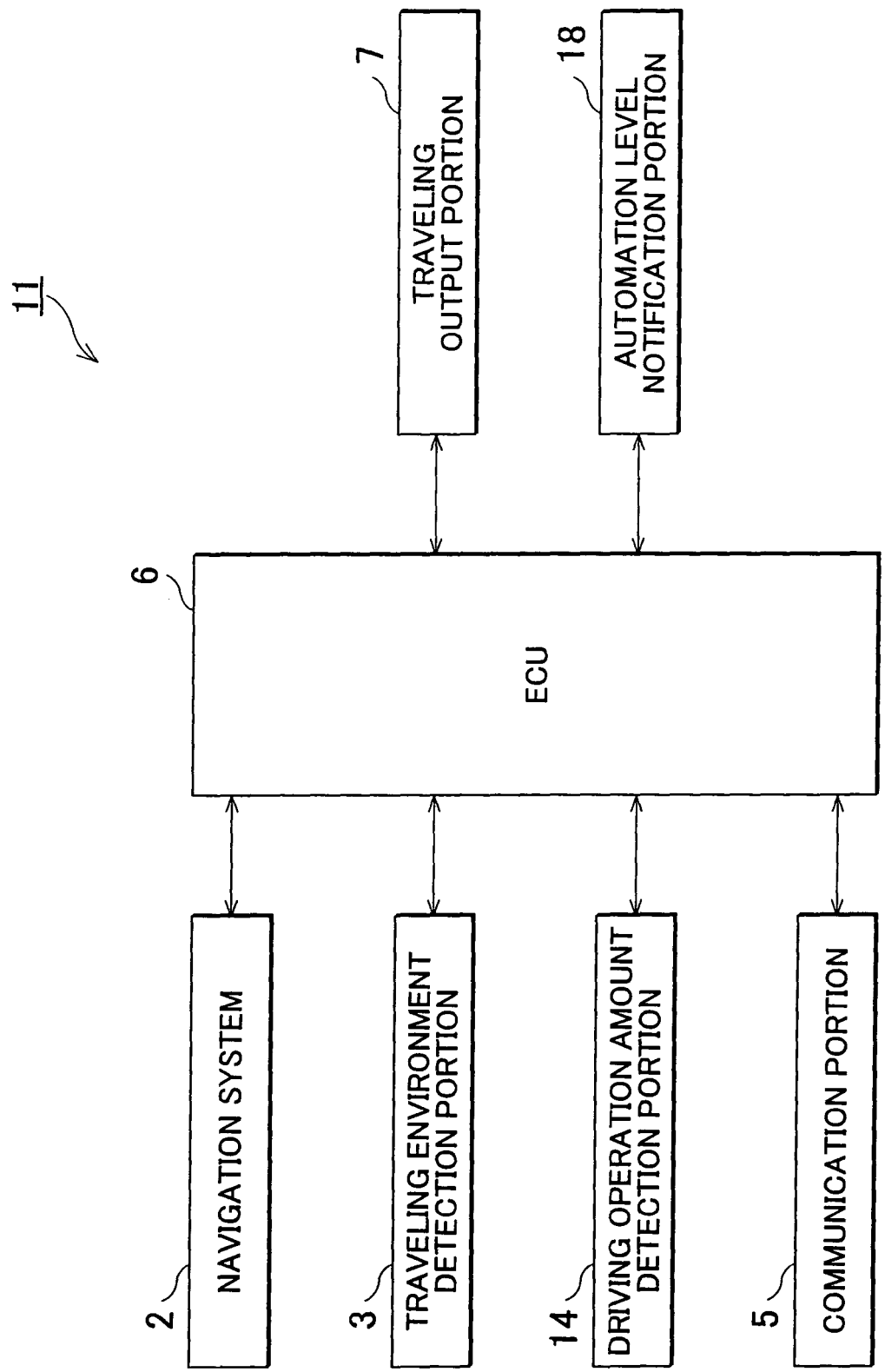
FIG. 7 is a schematic configuration diagram showing a driving assistance apparatus according to a second embodiment of the invention.

FIG. 7 is a schematic configuration diagram showing a driving assistance apparatus according to a second embodiment of the invention.

As shown in FIG. 7, the driving assistance apparatus 11 according to the embodiment is installed in a vehicle for which driving assistance is provided. Thus, the driving assistance apparatus 11 assists the driving of the vehicle. For example, in the driving assistance apparatus 11, the automation level of the vehicle is set according to the traveling environment in which the vehicle is traveling, and thus, an automatic driving control is executed.

The driving assistance apparatus 11 includes the navigation system 2, the traveling environment detection portion 3, a driving operation amount detection portion 14, the communication portion 5, the Electronic Control Unit (ECU) 6, the traveling output portion 7, and an automation level notification portion 18.

The driving operation amount detection portion 14 functions as driving operation amount detection means for detecting the amount of a driving operation performed by the driver. For example, the driving operation amount detection portion 14 includes sensors that detect the amount of a steering wheel operation, the amount of an accelerator operation, and the amount of a brake operation. More specifically, a steering torque sensor that detects the amount of the steering wheel operation, a stroke sensor that detects the amount of the accelerator operation, and a master cylinder pressure sensor that detects the amount of the brake operation are used.

The communication portion 5 is communication means for performing inter-vehicle communication and road-vehicle communication. The communication portion 5 functions as surrounding environment information obtaining means for obtaining traveling environment information ahead of the vehicle, through communication. In the driving assistance apparatus 11, the communication portion 5 may be omitted.

In the embodiment, if the driving assistance level is increased, the ECU 6 executes a driving assistance control that increases the driving assistance level according to the state of the driving operation performed by the driver. Also, if the driving assistance level is increased, the ECU 6 gradually increases the driving assistance level, and executes the driving assistance control.

For example, the driving assistance level is the level of automation of automatic driving. The driving assistance level is set according to the reliability degree of the traveling environment information. The driving assistance level may be set to increase as the reliability degree of the traveling environment information is increased. Thus, it is possible to, appropriately provide advanced driving assistance using the traveling environment information with high reliability degree. Also, it is possible to avoid the situation where advanced driving assistance is provided using the traveling environment information with low reliability degree.

The ECU 6 includes the traveling environment database in which the traveling environment information is stored and reserved. The ECU 6 functions as the driving assistance level calculation means for setting the driving assistance level based on the reliability degree of the traveling environment information.

The traveling output portion 7 performs the operation that drives the host vehicle, the operation that brakes the host vehicle, and the operation that steers the host vehicle according to the control signal output from the ECU 6. For example, the traveling output portion 7 includes the engine ECU, the brake ECU, and the steering ECU. When the automatic driving control is executed, the traveling output portion 7 functions as driving assistance means for assisting the driving of the vehicle.

Figure 8:
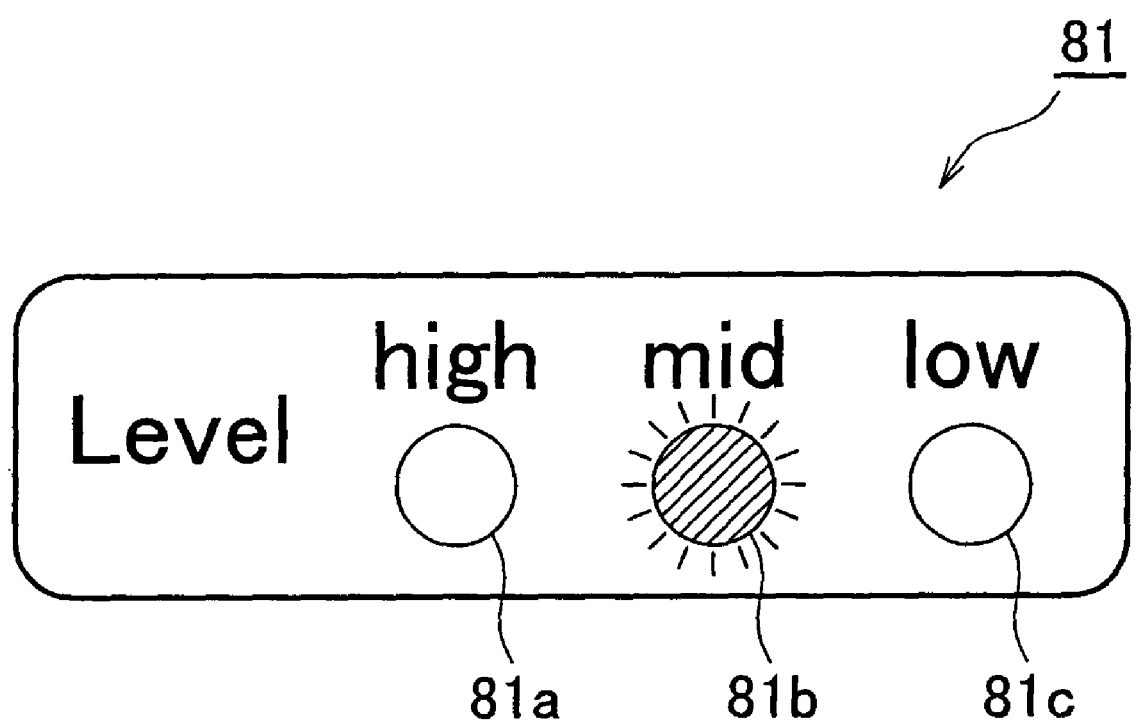
FIG. 8 is a diagram illustrating an indicator of the driving assistance apparatus shown in FIG. 7.

The automation level notification portion 18 is notification means for notifying the driver of the current automation level, when the automatic driving control is executed as the driving assistance control. For example, as shown in FIG. 8, an indicator 81 that indicates the automation level is used. The indicator 81 includes a high indication portion 81a for the high automation level, a medium indication portion 81b for the medium automation level, and a low indication portion 81c for the low automation level. In the indicator 81, one of the indication portions 81a to 81c, which corresponds to the current automation level, is appropriately lit up. In FIG. 8, the medium indication portion 81b is lit up. When the driver sees the indication of the indicator 81, the driver becomes aware of the current automation level. In addition to the indicator 81 in FIG. 8, a liquid crystal display portion that indicates the automation level, and a portion that notifies the driver of the automation level using voice may be employed as the automation level notification portion 18.

Next, the operation of the driving assistance apparatus according to the embodiment will be described.

Figure 9:
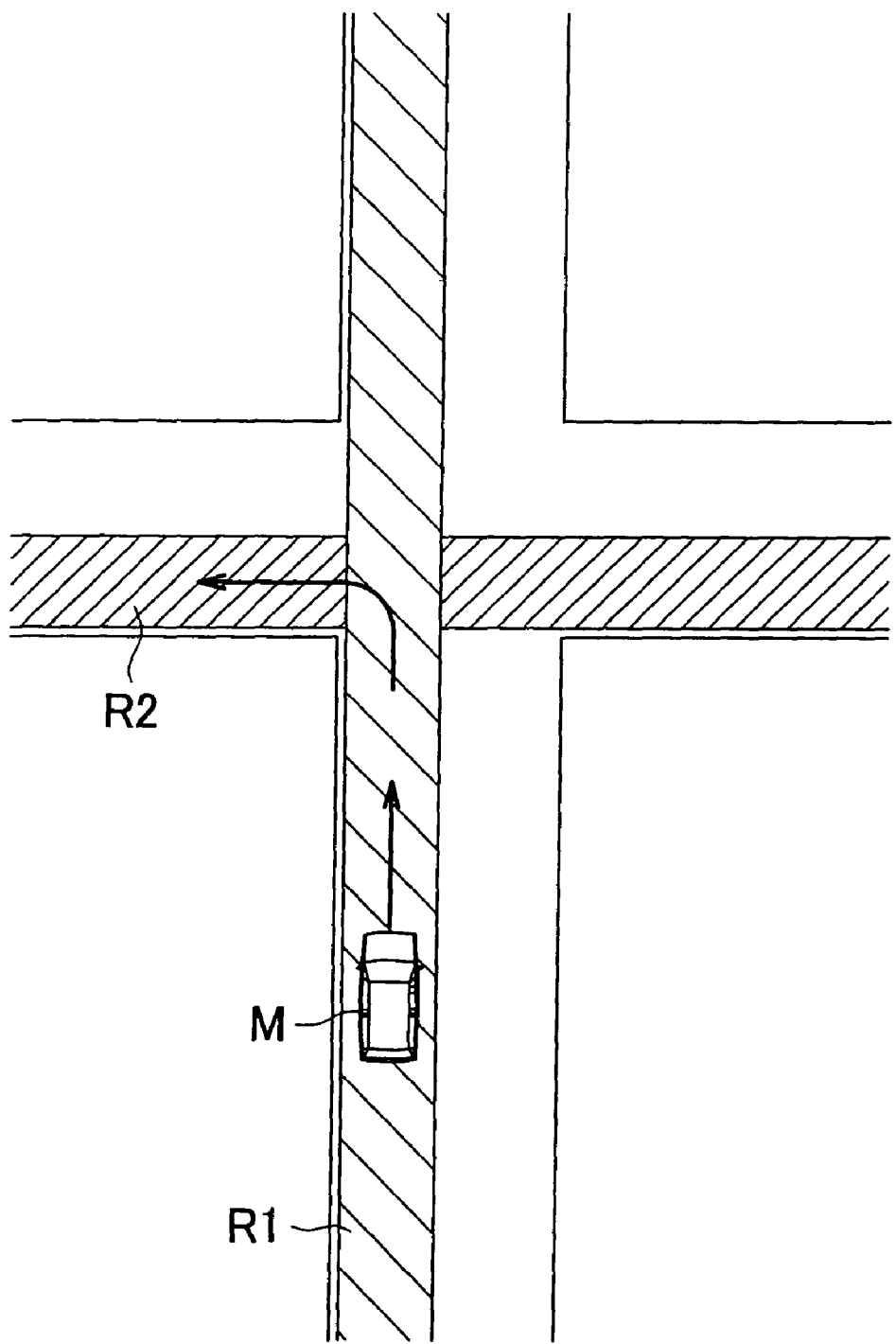
FIG. 9 is a diagram illustrating the operation of the driving assistance apparatus shown in FIG. 7.

FIG. 9 is a diagram illustrating the operation of the driving assistance apparatus according to the embodiment. FIG. 9 shows the contents of the driving assistance when the reliability degree of the traveling environment information is increased, and thus, the driving assistance level is increased.

As shown in FIG. 9, the vehicle M, for which the driving assistance is provided, travels on the route R1. If the reliability degree of the information on the traveling environment on the route R1 is low, the driving assistance level, that is, the automation level is set to a low level in accordance with the low reliability, and thus, the driving assistance control at the low automation level is executed. For example, the automatic driving control is executed so that only the brake operation is automated.

Figure 10A:
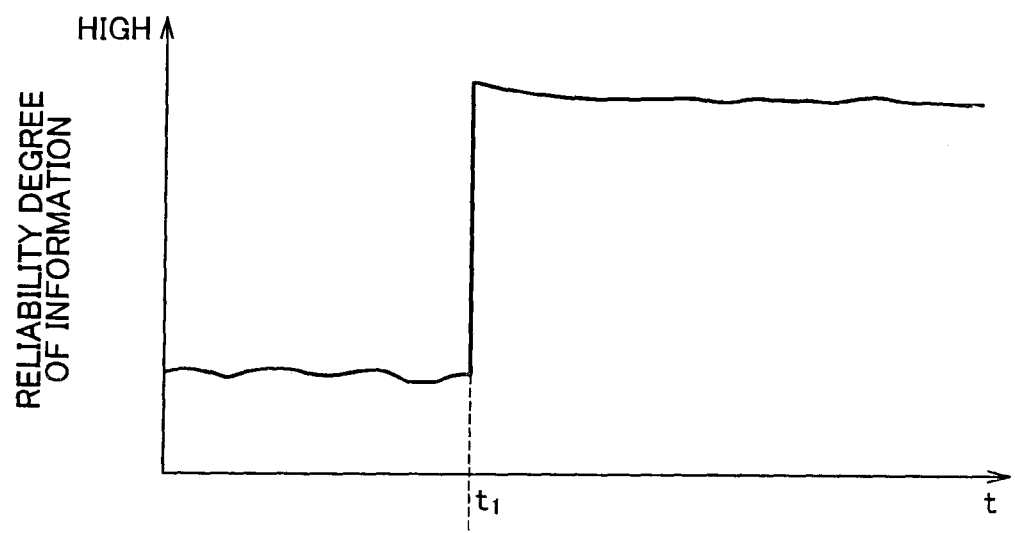
FIG. 10A and FIG. 10B are diagrams illustrating the operation of the driving assistance apparatus shown in FIG. 7.

If the vehicle M turns to the left at the intersection, the vehicle M moves from the route R1 to the route R2. If the reliability degree of the information on the traveling environment on the route R2 is higher than the reliability degree of the information on the traveling environment on the route R1, the reliability degree of the information may be sharply increased as shown in FIG. 10A (refer to a time point t1).

Figure 10B:
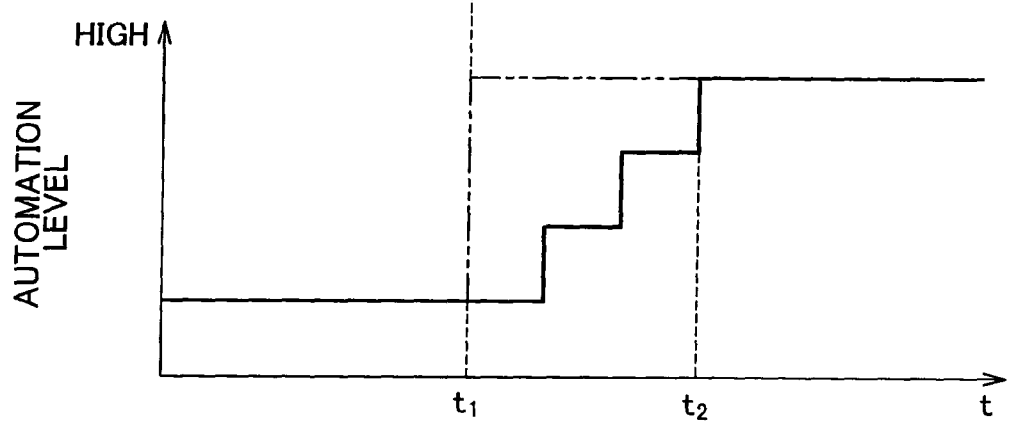

In this case, it is conceivable to sharply increase the automation level according to the increase in the reliability degree of the traveling environment information (refer to a two-dot chain line during a time period from the time point t1 to a time point t2 in FIG. 10B). However, in the driving assistance apparatus 11, the driving assistance level is increased according to the state of the driving operation performed by the driver. For example, if the amount of the driving operation performed by the driver is smaller than a control target value set in the automatic driving control, the automation level is increased.

In the case where a steering wheel operation control, an accelerator operation control, or a brake operation control is automated, if the amount of a driving operation performed by the driver is smaller than a control target value in a certain control, the certain control is gradually automated. For example, if the torque value of the steering wheel operated by the driver is smaller than the control target value of steering torque in the steering wheel operation control, the steering wheel operation control is automated, and the automation level is increased. At this time, the automation level of the control may be gradually increased. The automation level may be increased in a stepwise manner.

That is, the automation level is gradually increased, more specifically, the automation level is increased in a stepwise manner, as shown by the solid line during the time period from the time point t1 to the time point t2 in FIG. 10B. At this time, the automation level may be increased by gradually increasing the contents of the automatic driving control, or by gradually increasing the amount of the automatic driving control.

Also, if the automation level of the control of a certain operation is increased, and thus, the control of the certain operation is automated, a driver's load relating to the certain operation may be made larger than that before the automation level is increased. For example, if the steering wheel operation control is automated, a steering wheel reaction force is increased; if the accelerator operation control is automated, an accelerator operation reaction force is increased; and if the brake operation control is automated, a brake operation reaction force is increased. Thus, the driver easily perceives that the control is automated, through maneuvering feeling.

If the automation level of the automatic driving control is increased, the automation level is gradually increased. Thus, it is possible to reduce the sense of discomfort of the driver, which is caused by the increase in the driving assistance level.

If the automation level of the automatic driving control is increased, the driving assistance level is increased according to the state of the driving operation performed by the driver. Thus, it is possible to reduce the sense of discomfort of the driver, which is caused by the increase in the driving assistance level.

Figure 11:
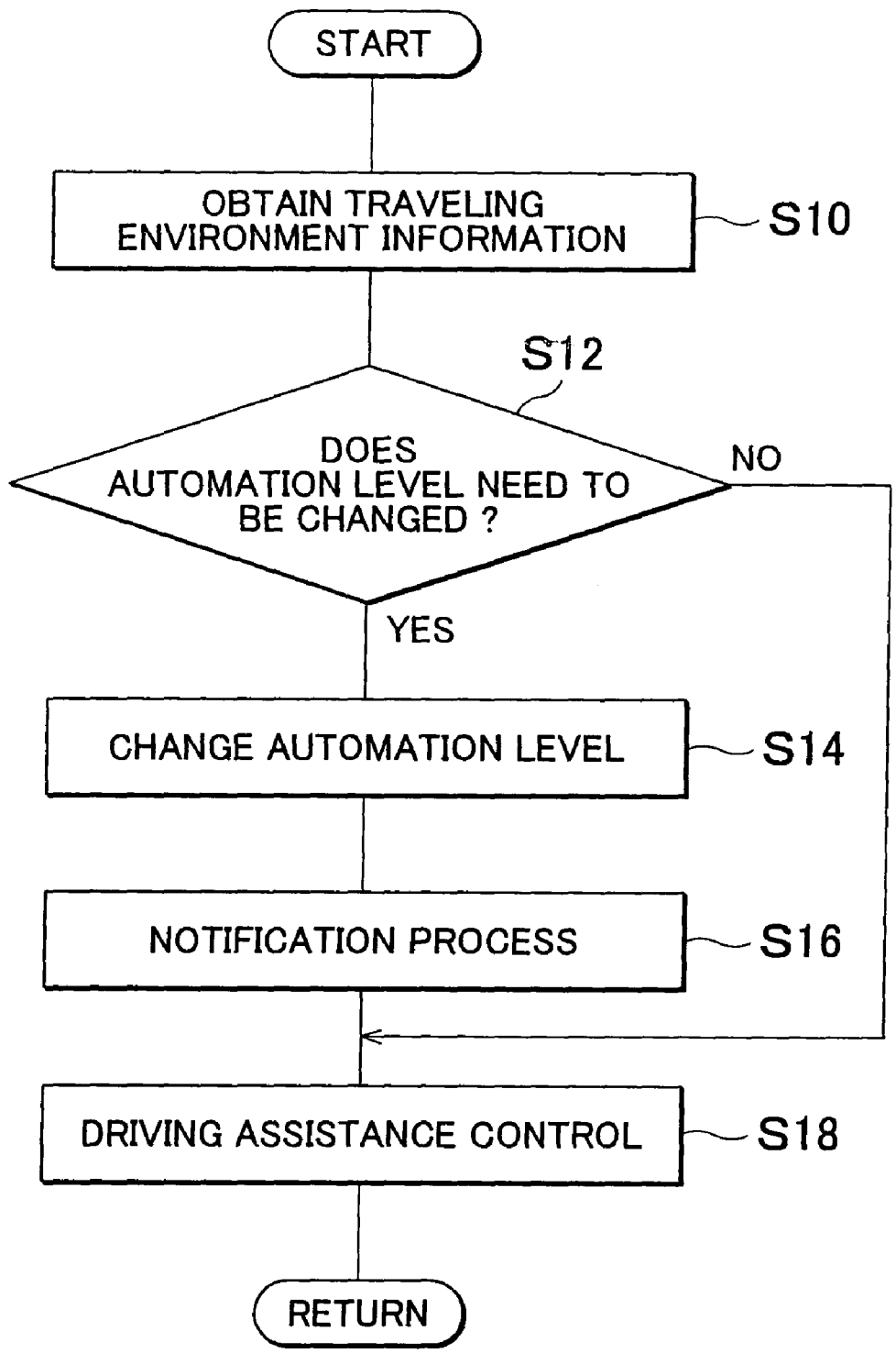
FIG. 11 is a flowchart showing the operation of the driving assistance apparatus shown in FIG. 7.

FIG. 11 is a flowchart showing the operation of the driving assistance apparatus according to the embodiment.

A control routine shown in FIG. 11 is repeatedly executed, for example, by the ECU 6 at predetermined time intervals. First, as shown in step S10 in FIG. 11, a traveling environment information obtaining process is executed. In the traveling environment information obtaining process, information on the traveling environment around the vehicle, for which the driving assistance is provided, is obtained. For example, the traveling environment information is obtained based on information detected by the traveling environment detection portion 3. Also, the traveling environment information may be obtained based on information received by the communication portion 5. The reliability degree of the obtained traveling environment information is stored in the ECU 6. The automation level is set according to the reliability degree of the traveling environment information. At this time, the automation level is set to increase as the reliability degree of the traveling environment information is increased.

For example, the automation level is set in a stepwise manner. More specifically, if the automation level is set to a high level, the steering operation, the accelerator operation, and the brake operation are all automated. If the automation level is set to a medium automation level, the accelerator operation and the brake operation are automated. If the automation level is set a low level, only the brake operation is automated.

Then, the routine proceeds to step S12. In step S12, it is determined whether the automation level of the automatic driving control needs to be changed. For example, it is determined that the automation level of the automatic driving control needs to be changed, when the vehicle moves from one route to another route, and the reliability degree of the traveling environment information is increased, and accordingly, the automation level needs to be increased, or when the vehicle moves from one route to another route, and the reliability degree of the traveling information is decreased, and accordingly, the automation level needs to be decreased.

If it is determined that the automation level of the automatic driving control does not need to be changed in step S12, the routine proceeds to step S18. In step S18, the driving assistance control is executed according to the current automation level. If it is determined that the automation level of the automatic driving control needs to be changed in step S12, an automation level change process is executed.

In the automation level change process, the automation level of the automatic driving control is changed, that is, the contents of the automatic driving control at the current automation level are changed to the contents of the automatic driving control at a target automation level. In the change process, if the automation level is increased, the automation level is increased in a stepwise manner so that the automation level is not sharply increased. For example, if the automation level is increased from the low level to the high level, the automation level is increased in a stepwise manner, that is, the automation level is increased from the low level to the medium level, and then, increased from the medium level to the high level.

Also, if the automation level is increased, the driving assistance level may be increased in a stepwise manner according to the state of the driving operation performed by the driver. For example, if the amount of the driving operation performed by the driver is smaller than the control target value set in the automatic driving control, the automation level is increased. In other words, in the case where the steering wheel operation control, the accelerator operation control, or the brake operation control is automated, the amount of the steering wheel operation, the amount of the accelerator operation, and the amount of the brake operation are detected. If the amount of the driving operation performed by the driver is smaller than a control target value in a certain control, the certain control is gradually automated. More specifically, if the torque value of the steering wheel operated by the driver is smaller than the control target value of the steering torque in the steering wheel operation control, the steering wheel operation control is automated, and the automation level is increased.

Then, the routine proceeds to step S16. In step S16, a notification process is executed. In the notification process, the driver is notified of a change in the automation level of the automatic driving control. For example, the ECU 6 outputs an actuation signal to the automation level notification portion 18, and the indicator 81 of the automation level notification portion 18 is lit up to notify the driver of the automation level.

Then, the routine proceeds to step S18. In step S18, a driving assistance control process is executed. In the driving assistance control process, the driving assistance control is executed according to the automation level. For example, if the automation level is set to the level at which the steering operation, the accelerator operation, and the brake operation are all automated, the driving assistance control is executed to automate the steering operation, the accelerator operation, and the brake operation. If the automation level is set to the level at which the accelerator operation and the brake operation are automated, the driving assistance control is executed to automate the accelerator operation and the brake operation. If the automation level is set to the level at which only the brake operation is automated, the driving assistance control is executed to automate the brake operation. After the process in step S18 ends, the control routine ends.

As described above, in the driving assistance apparatus according to the embodiment, if the automation level, which is the driving assistance level, is increased, the automation level is gradually increased according to the state of the driving operation performed by the driver. Thus, it is possible to reduce the sense of discomfort of the driver, which is caused by the increase in the automation level.

Also, in the driving assistance apparatus according to the embodiment, if the automation level is increased, the automation level is gradually increased. Thus, it is possible to reduce the sense of discomfort of the driver, which is caused by the increase in the automation level.

While some embodiments of the invention have been illustrated above, it is to be understood that the invention is not limited to details of the illustrated embodiments, but may be embodied with various changes, modifications or improvements, which may occur to those skilled in the art, without departing from the scope of the invention.

The invention claimed is:

1. A driving assistance apparatus characterized by comprising:
   a surrounding environment information obtaining unit that obtains traveling environment information that is information on a traveling environment around a vehicle;
   a driving assistance unit configured to perform a driving assistance operation that assists a driver of the vehicle in driving the vehicle; and
   a driving assistance control unit configured to control the driving assistance unit so that the driving assistance operation is performed according to the obtained traveling environment information, and for executing a control so that a level of the driving assistance operation is gradually changed if the level of the driving assistance operation is changed, wherein
   the driving assistance control unit executes a control so that the level of the driving assistance operation is gradually increased if the level of the driving assistance operation is increased,
   the driving assistance control unit executes a control so that the level of the driving assistance operation is increased according to a state of a driving operation performed by the driver of the vehicle if the level of the driving assistance operation is increased, and
   wherein the driving assistance unit executes a plurality of the driving assistance operations; and
   the driving assistance control unit selects the driving assistance operation whose level is to be increased, from among the plurality of the driving assistance operations, according to a state of a driving operation performed by the driver of the vehicle.

2. The driving assistance apparatus according to claim 1, wherein the driving assistance control unit sets a reliability degree of the obtained traveling environment information, and executes a control so that the level of the driving assistance operation is changed according to the set reliability degree.

3. The driving assistance apparatus according to claim 1, wherein the driving assistance control unit executes a control so that the level of the driving assistance operation is changed in a stepwise manner if the level of the driving assistance operation is gradually changed.

4. The driving assistance apparatus according to claim 1, wherein the driving assistance control unit executes a control so that the level of the driving assistance operation is gradually decreased if the level of the driving assistance operation is decreased.

5. The driving assistance apparatus according to claim 2, wherein the driving assistance control unit executes a control so that the level of the driving assistance operation is decreased as the reliability degree of the traveling environment information is set to decrease.

6. The driving assistance apparatus according to claim 5, wherein if it is predicted that the vehicle will enter an area where the reliability degree of the traveling environment information is set to a low value, the driving assistance control unit executes a control so that the level of the driving assistance operation is decreased before the vehicle enters the area.

7. The driving assistance apparatus according to claim 4, wherein if it is determined that a time period, in which the level of the driving assistance operation will remain decreased, is shorter than a predetermined time period when it is predicted that the level of the driving assistance operation will be decreased, the driving assistance control unit executes a control so that the level of the driving assistance operation is not decreased.

8. The driving assistance apparatus according to claim 4, further comprising
 a sensed speed adjustment unit configured to increase a speed of the vehicle sensed by an occupant of the vehicle if the level of the driving assistance operation performed by the driving assistance unit is decreased according to the traveling environment information.

9. The driving assistance apparatus according to claim 8, wherein the plurality of the driving assistance operations include an operation that assists the driver in operating a steering wheel, an operation that assists the driver in operating an accelerator, and an operation that assists the driver in operating a brake.

10. The driving assistance apparatus according to claim 8, wherein the driving assistance control unit executes a control so that a driver's load relating to a driving operation is increased, as the level of the driving assistance operation is increased.

11. A driving assistance method characterized by comprising:
 obtaining traveling environment information that is information on a traveling environment around a vehicle;
 performing a driving assistance operation that assists a driver of the vehicle in driving the vehicle;
 setting a reliability degree of the obtained traveling environment information; performing the driving assistance operation whose level corresponds to the set reliability degree; and
 gradually changing the level of the driving assistance operation if the level of the driving assistance operation is changed.

12. A driving assistance apparatus comprising:
 a surrounding environment information obtaining unit that obtains traveling environment information that is information on a traveling environment around a vehicle;
 a driving assistance unit configured to control a driving assistance operation that assists a driver of the vehicle in driving the vehicle;
 a driving assistance control unit configured to control the driving assistance operation performed by the driving assistance unit according to the obtained traveling environment information, and for increasing a level of the driving assistance operation according to a state of a driving operation performed by the driver of the vehicle; and
 the driving assistance control unit executes a control so that the level of the driving assistance operation is gradually increased if the level of the driving assistance operation is increased,
 the driving assistance control unit executes a control so that the level of the, driving assistance operation is increased according to a state of a driving operation performed by the driver of the vehicle if the level of the driving assistance operation is increased, and
 wherein the driving assistance unit executes a plurality of the driving assistance operations; and
 the driving assistance control unit selects the driving assistance operation whose level is to be increased, from among the plurality of the driving assistance operations, according to a state of a driving operation performed by the driver of the vehicle.

* * * * *